United States Patent
Galyas et al.

(10) Patent No.: US 6,577,620 B1
(45) Date of Patent: Jun. 10, 2003

(54) EMULATING CIRCUIT-SWITCHED COMMUNICATIONS IN A PACKET-SWITCHED ENVIRONMENT

(75) Inventors: Peter Galyas, Täby (SE); Lars Westberg, Enköping (SE); Stefan Jung, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/303,727

(22) Filed: May 3, 1999

(51) Int. Cl.[7] .............................................. H04L 12/66
(52) U.S. Cl. ....................... 370/352; 370/356; 370/474; 370/503; 370/535
(58) Field of Search ................................ 370/352–356, 370/389, 392, 401, 412, 426, 474, 465–467, 535, 537, 540, 542–544, 503; 379/88.17

(56) References Cited

U.S. PATENT DOCUMENTS

| 4,893,306 A | | 1/1990 | Chao et al. ................ 370/94.2 |
| 4,897,832 A | | 1/1990 | Suzuki et al. ................. 370/81 |
| 5,742,596 A | * | 4/1998 | Baratz et al. ................ 370/356 |
| 5,742,761 A | | 4/1998 | Olnowich et al. ......... 395/200.2 |
| 5,883,891 A | * | 3/1999 | Williams et al. ............ 370/356 |
| 5,956,334 A | * | 9/1999 | Chu et al. .................... 370/352 |
| 6,246,681 B1 | * | 6/2001 | Humphrey et al. ......... 370/389 |
| 6,304,567 B1 | * | 10/2001 | Rosenberg ................... 370/356 |

FOREIGN PATENT DOCUMENTS

| EP | 0 756 267 A1 | 1/1997 |
| GB | 2 050 120 A | 12/1980 |
| WO | WO 97/48211 | 12/1997 |
| WO | WO 99/13679 | 3/1999 |

OTHER PUBLICATIONS

Standard Search Report, as issued in connection with U.S. patent application No. 09/303,727, completed by Examiner K. Vaskimo on Nov. 5, 1999.

* cited by examiner

Primary Examiner—Ajit Patel
(74) Attorney, Agent, or Firm—Jenkens & Gilchrist, P.C.

(57) ABSTRACT

A circuit emulation method with garbage removal is used to convert a circuit-switched network for packet-switched transmissions while reusing as much of the existing circuit-switched infrastructure as possible. The garbage removal function removes unnecessary information from a packet before it can be transported, which increases the transport efficiency and decreases the transport delay.

31 Claims, 1 Drawing Sheet

EMULATING CIRCUIT-SWITCHED COMMUNICATIONS IN A PACKET-SWITCHED ENVIRONMENT

BACKGROUND OF THE INVENTION

1. Technical Field of the Invention

The present invention relates in general to the telecommunications field and, in particular, to a method for emulating circuit-switched communications in a packet-switched transport network.

2. Description of Related Art

When introducing packet-based transmissions into former circuit-switched communications networks (e.g., typical wireless access networks), for a number of reasons it is important to be able to reuse the circuit-switched equipment where possible, and also meet the delay requirements of such a system. It is especially important to be able to reuse the already installed base equipment (e.g., in wireless access networks, the radio base stations and speech/data transcoders).

One of the driving forces behind the introduction of packet-based transport networks is the gain in transmission efficiency that can be utilized for discontinuous transmission (DTX) communications and statistical multiplexing applications. Consequently, it is important to be able to reuse installed base equipment and still obtain the highest gain in transmission efficiency possible.

There are a number of ways of converting a circuit-switched network for packet-switched communications, with the aim of reusing as much circuit-switched equipment as possible. One solution is to upgrade the software for the circuit-switched equipment so that it can handle packet-switched communications. However, in many cases, the circuit-switched hardware has inherent limitations that make such software upgrades virtually impossible to implement. Another solution is to use the method known as Circuit Emulation (CE). The CE concept builds on an approach whereby several circuit-switched channels are multiplexed into a packet which is transferred across a packet-switched network to an end-point or node. At this end-point, the received packet is de-multiplexed and the original circuit-switched bit stream is recreated.

For example, the above-described CE approach is used in Asynchronous Transfer Mode (ATM) communications technology with fixed length packets. The most significant drawbacks of this CE approach are that the resulting transmission efficiencies are lower than those experienced with the conventional circuit-switched solutions, and the different independent circuit-switched channels have to be unpacked before they can be switched within the packet-switched network. However, an advantage of the above-described CE approach is that it produces relatively good transmission delay characteristics.

The third solution that can be used to convert existing circuit-switched equipment for packet-switched communications is to insert a protocol converter between the circuit-switched and packet-switched networks. However, the transmission delay characteristics resulting from this gateway solution are typically not good enough for real-time services (e.g., speech).

Essentially, there are three issues to consider when a change in transport technology from circuit-switched to packet-switched technology is being planned: delay; transport efficiency; and equipment reuse. The delay associated with the transport technology is an important issue to consider when the payload involves real-time services (e.g., speech). As such, the existing CE approaches can solve this real-time service problem, but not in a transport efficient manner. The transport efficiency of the technology to be used is another important issue to consider in certain applications, such as in cellular access networks. However, transport efficiency is not a major issue when bandwidth is inexpensive, but in many applications this is not the case. In any event, the basic problem that needs to be addressed is how to change a transport technology in a mobile communications system from circuit-switched to packet-switched so that an already installed circuit-switched infrastructure can be maintained, and an efficient transport with a relatively low delay can still be obtained. As described in detail below, the present invention successfully resolves this problem and other related problems.

SUMMARY OF THE INVENTION

In accordance with a preferred embodiment of the present invention, a circuit emulation method with garbage removal is used to convert a circuit-switched network for packet-switched transmissions while reusing as much of the existing circuit-switched infrastructure as possible. The garbage removal function removes unnecessary information before it can be transported, which increases the transport efficiency and decreases the transport delay.

An important technical advantage of the present invention is that circuit-switched equipment can be used in a packet-switched transport network, without making changes to the circuit-switched equipment regardless of existing hardware limitations.

Another important technical advantage of the present invention is that existing circuit-switched equipment can be reused for packet-switched transmissions, while fulfilling the delay requirements placed on real-time services and not wasting transmission resources.

Still another important technical advantage of the present invention is that circuit-switched equipment can be used in a packet-switched transport network in a manner that increases the transport efficiency and decreases the transport delay.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–5 of the drawings, like numerals being used for like and corresponding parts of the various drawings.

Essentially, in accordance with a preferred embodiment of the present invention, a circuit emulation method with garbage removal is used to convert a circuit-switched network for packet-switched transmissions while reusing as much of the existing circuit-switched infrastructure as possible. The garbage removal function removes unnecessary information before it can be transported, which increases the transport efficiency and decreases the transport delay. For example, the unnecessary information that can be removed to increase transport efficiency and reduce delay includes information that can exist while a connection is inactive, compressed speech information that can exist while a speaker is silent, information from bad or unusable frames, etc.

Figure 1:
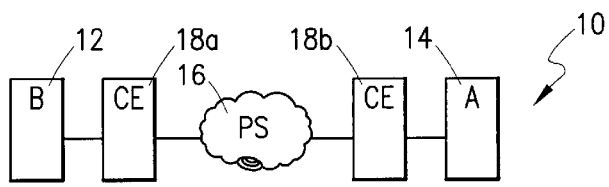
FIG. 1 is a simplified block diagram of an exemplary communication system that can be used to implement a preferred embodiment of the present invention.
Figure 2:
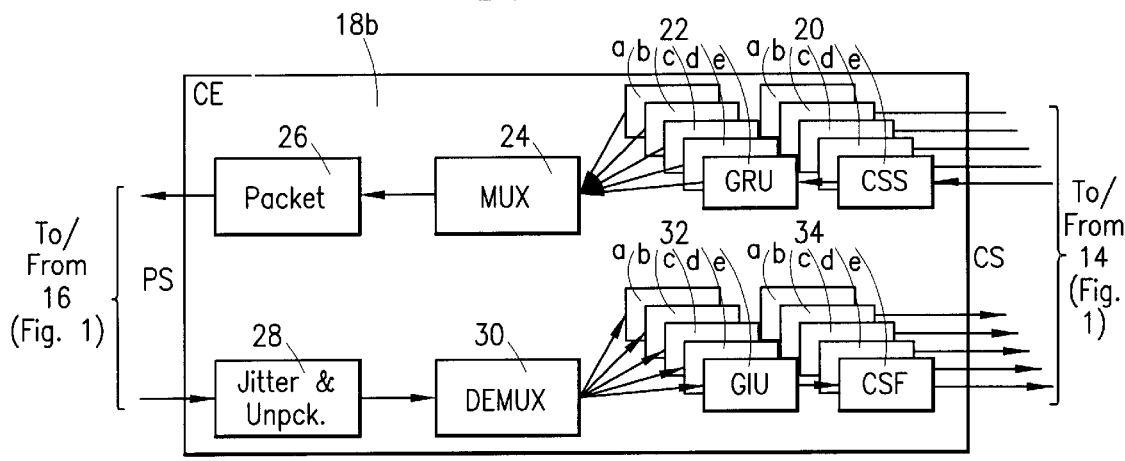
FIG. 2 is a diagram of an exemplary single circuit emulation unit with garbage removal, which can be used to implement the preferred embodiment of the present invention.

Specifically, FIG. 1 is a simplified block diagram of an exemplary communication system 10 that can be used to implement a preferred embodiment of the present invention. For illustrative purposes, the following description shows how the present invention can be implemented for a circuit-switched service such as speech. However, the scope of the present invention is not intended to be so limited and can include other circuit-switched services as well. Referring to FIG. 1, the exemplary system 10 includes at least two circuit-switched nodes 12 and 14. For example, node 12 can be at a radio base station in a Public Land Mobile Network (PLMN), and node 14 can be a speech transcoder at another location (e.g., in a gateway to a Public Switched Telephone Network or PSTN) in the PLMN. In this example, system 10 also includes a packet-switched network 16 which is being operated in accordance with a conventional protocol, such as, for example, using a Transmission Control Protocol/Internet Protocol (TCP/IP) stack approach. Conceptually, blocks 18a and 18b can represent two parts of a single CE unit (18) at the points of interconnection between the circuit-switched and packet-switched networks. Alternatively, blocks 18a and 18b can also represent two separate and distinct CE units. A diagram of an exemplary single CE unit (e.g., 18b), which can be used to implement the preferred embodiment of the present invention, is shown in FIG. 2. A corresponding CE unit (e.g., 18a) can be the mirror image of the CE unit shown in FIG. 2.

Referring to FIG. 2, the exemplary CE unit (18b) shown includes (moving from the circuit-switched side to the packet-switched side) a plurality of Circuit-Switched Synchronization (CSS) units 20a–e. For this embodiment, each CSS unit synchronizes to a different narrow-band channel (from unit 14). In an exemplary cellular system such as the Global System for Mobile Communications (GSM), a typical data rate for such a narrow-band channel is 16 kbits/s for compressed speech. As shown, one CSS unit 20a–e is provided for each channel. If there is a period when there is no active connection for any such channel, the corresponding CSS unit for that channel detects the idle pattern and forwards no frame(s) to a corresponding Garbage Removal Unit (GRU) 22a–e.

Each GRU 22a–e determines, for each frame received from the corresponding CSS unit 20a–e, whether the frame should be forwarded to a multiplexer 24 or removed (e.g., often referred to as silence detection). As such, a number of different methods can be used by a GRU to determine whether or not incoming data (from a CSS unit) includes speech information. For example, when a frame contains compressed speech, this fact is included as information in a control field within the frame. Since each CSS unit (and corresponding GRU) is synchronized with respect to the frame timing, a GRU can wait for a control field to appear, detect the presence or absence of compressed speech in the frame from the control field information, and then decide whether or not to remove the frame or forward it to the multiplexer. For this embodiment, a GRU 22a–e will remove a frame if the control field associated with that frame indicates the absence of compressed speech information in that frame. If, for some reason, a control field associated with a particular frame does not contain information indicating the presence or absence of compressed speech, or the frame contains uncompressed speech, a known algorithm can be used by the respective GRU to differentiate between the speech information in the frame (if any) and background noise. These algorithms are commonly referred to as silence detection algorithms.

In certain contexts, it can be beneficial for a GRU 22a–e to remove bad frames. These so-called bad frames are frames that have been corrupted in such a way that the information contained in the frame is unusable. Typically, such bad frames occur more frequently when the frames have been transmitted over a radio air interface prior to reaching the circuit-switched node. However, systems that use such radio air interfaces typically convey a signal with a transmitted speech frame that indicates whether the transmitted frame is good or bad. A GRU can remove a bad frame based on the receipt of such a signal.

An example of a GRU's operation is if a channel on the circuit-switched side is a GSM full-rate speech channel (following the GSM Technical Specification TS GSM 08.60), a GRU will not forward a frame for the following cases: frame type not equal to SPEECH; and Bad Frame Indication (BFI)=1.

The multiplexer 24 assembles a packet for transmission from a portion of the information in the frames forwarded from each of the GRUs 22a–e. The multiplexer also forms a (concatenated) header that describes the state (SPEECH or SILENT) for each channel contained in the assembled packet.

For example, the header can be composed of one bit per channel, which indicates the state (SPEECH or SILENT) of the associated channel. The packet thus assembled contains a bitmap for each channel's state (SPEECH or SILENT) and a fraction of the data (if any) from each channel. It is important to note that the fractions of data in the assembled packet include the data received thus far from the circuit-switched channels (excluding the data assembled in prior packets).

Figure 3:
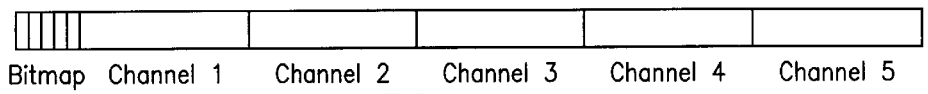
FIG. 3 is a diagram of an exemplary packet that can be assembled by the multiplexer shown in FIG. 2 for five circuit-switched channels, in accordance with the preferred embodiment of the present invention.

FIG. 3 is a diagram of an exemplary packet that can be assembled by the multiplexer 24 for five circuit-switched channels, in accordance with the preferred embodiment of the present invention. As shown, the exemplary packet includes five bits (1–5) in a header. Each bit in the header represents the state (SPEECH or SILENT) of a respective channel (Channel 1–5). In other words, bit 1 in the header corresponds to (and indicates the state of) Channel 1 and so on. For this embodiment, the assembled packet includes two bytes of data for each of the five channels. However, note that the number of bytes allowed for each channel, and the number of channels, are matters of design choice and not intended as limitations on the scope of the present invention. As illustrated by the assembled packet shown in FIG. 3, all of the channels are active (i.e., in the SPEECH state).

Figure 4:
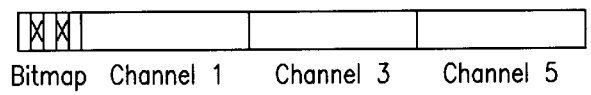
FIG. 4 is a diagram of a second exemplary packet that can be assembled by the multiplexer shown in FIG. 2 for five circuit-switched channels, in accordance with a different aspect of the preferred embodiment.
Figure 5:
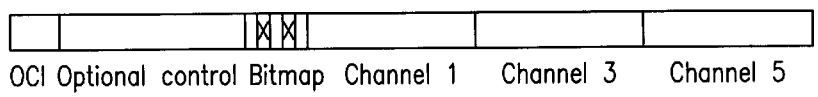
FIG. 5 is an example of a packet that includes an Optional Control Indicator (OCI) field and associated optional control information field, in accordance with yet another aspect of the preferred embodiment.

FIG. 4 is a diagram of a second exemplary packet that can be assembled by the multiplexer 24 for five circuit-switched channels, in accordance with a different aspect of the preferred embodiment. As shown, the exemplary packet includes data for Channels 1, 3 and 5 only. In this case, Channels 2 and 4 are shown in the SILENT state, and no data are included in the packet for these channels. Also, the bits (2,4) in the header indicate that the corresponding channels are silent. Advantageously, in accordance with the present invention, the size of the assembled packet shown in FIG. 4 has been decreased in proportion to the number of channels in the SILENT state, which decreases packet transport delay and increases transport efficiency.

As illustrated by a comparison of FIGS. 3 and 4, the size of the assembled packet varies in proportion to the number of active channels. As such, the maximum size of the assembled packet can be reached when all of the involved channels (e.g., 1–5 for this embodiment) are active at the same time.

Notably, the maximum size of an assembled packet can be controlled by the number of channels being multiplexed to form the packet, and the amount of data from each such channel being contained in the packet. The amount of data from each channel also corresponds to the amount of buffer delay introduced into the CE unit 18b. For this embodiment, a buffer (e.g., register or elastic buffer) can be used in the CE unit to temporarily store the data extracted from one or more of the circuit-switched channels. For example, the assembled packets shown in FIGS. 3 and 4 include two bytes per channel for data. If the CE unit extracts two bytes of data from a 16 kbits/s compressed voice channel, this corresponds to a 1 ms buffer delay. Consequently, the amount of data extracted from each channel and the maximum number of bytes allowed for each channel, are two parameters that can be adjusted to obtain desired performance (e.g., transport efficiency and transport delay).

Under certain circumstances, there can be a need for additional control information in a frame. Two of these circumstances arise when a connection is either initiated or terminated. The signalling to provide this control information is preferably conveyed to the CE unit (18b) in-band, but it can also be conveyed out-of-band. The reason why it is preferable to convey this type of signalling in-band is for synchronization purposes. For example, if a connection is terminated, an additional control field can be included in the affected frame from the circuit-switched channel with information to indicate the channel number for the terminated connection, and from that moment on, the multiplexed packet will contain one less channel. This type of signalling can be readily synchronized to the data stream, which accounts for the dynamic behavior of the connections. Importantly, this signalling information can be transmitted at the time the transient occurs. For this embodiment, an OCI field can be included in the assembled packet to indicate whether or not this signalling information was present in a frame. An example of such an OCI field and associated optional control information field is shown in the packet illustrated in FIG. 5.

Returning to FIG. 2, the assembled multiplexed "frame" is forwarded from the multiplexer 24 to the packetizer 26, which packetizes the "frame" in accordance with the protocol format used in the packet-switched network 16 (e.g., IP). The resulting packet is then transmitted over the packet-switched network 16 to another CE unit (e.g., 18a).

Referring again to FIG. 2, but now moving from the packet-switched side to the circuit-switched side, the CE unit (e.g., 18b) for the exemplary embodiment also includes a jitter handler and unpacker unit 28. The primary function of this unit is to remove the jitter inherent in the incoming packet, and terminate the packet-switched network protocol (e.g., IP). The demultiplexer 30 analyzes the header (SPEECH/SILENT bitmap) in the incoming packet (and the OCI field, if present), extracts the data from each of the channel fields present, and forwards the data from each channel field to a respective Garbage Inducer Unit (GIU) 32a–e. When there is no speech information present for a particular channel, the GIU 32a–e associated with that channel inserts into that channel the type of filler information used by the circuit-switched network (e.g., 14) when there is no speech information being conveyed. For example, if a channel on the circuit-switched side is a GSM full-rate speech channel (following the GSM Technical Specification TS GSM 08.60), a GIU inserts frames of the type Idle Speech for the circuit-switched side, when the GIU is not receiving frames from the demultiplexer. The corresponding Circuit-Switched Framer (CSF) units 34a–e recreate the bit stream for transmission over the circuit-switched network (14) using the appropriate circuit-switched frames and channel structure.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A circuit emulation unit, comprising:
   a plurality of removal units, each one of said plurality of removal units coupled to one of a plurality of circuit-switched channels, for forwarding or removing a frame of information
   a plurality of removal units, each one of said plurality of removal units coupled to one of a plurality of circuit-switched channels, for forwarding or removing a frame of information received from said plurality of circuit-switched channels in response to a predetermined condition;
   a plurality of synchronization units coupled to said plurality of removal units and said plurality of circuit-switched channels, for synchronizing said circuit emulation unit with each of said plurality of circuit-switched channels; and
   a multiplexer coupled to an output of each one of said plurality of removal units, for assembling a packet from said forwarded frames of information.

2. The circuit emulation unit of claim 1, further comprising:
   a packetizer coupled to an output of said multiplexer, for formatting the assembled packet for transmission over a packet-switched network.

3. The circuit emulation unit of claim 1, wherein said each of said plurality of circuit-switched channels comprises a narrow band channel for compressed speech.

4. The circuit emulation unit of claim 1, wherein said each of said plurality of circuit-switched channels comprises a GSM network channel.

5. The circuit emulation unit of claim 1, wherein said predetermined condition comprises speech in said frame of information received from said plurality of circuit-switched channels, and said frame of information is forwarded to said multiplexer.

6. The circuit emulation unit of claim 1, wherein said predetermined condition comprises an absence of speech in said frame of information received from said plurality of circuit-switched channels, and said frame of information is not forwarded to said multiplexer.

7. The circuit emulation unit of claim 1, wherein said predetermined condition comprises uncompressed speech in said frame of information received from said plurality of circuit-switched channels, and said frame of information is not forwarded to said multiplexer.

8. The circuit emulation unit of claim 1, wherein said predetermined condition comprises a presence of a bad frame received from said plurality of circuit-switched channels, and said frame is not forwarded to said multiplexer.

9. A circuit emulation unit, comprising:
   a depacketizing unit coupled to a packet-switched network, for terminating a protocol associated with a packet received from said packet-switched network;

a demultiplexer coupled to said depacketizing unit, for extracting channel information from said received packet; and a plurality of inducer units, each one of said plurality of inducer units coupled to a respective output of said demultiplexer, for inserting filler information in said channel information in response to a predetermined condition.

10. The circuit emulation unit of claim 9, further comprising a plurality of circuit-switched framer units coupled to said plurality of inducer units, for formatting said channel information for transmission over a circuit-switched network.

11. The circuit emulation unit of claim 9, wherein said predetermined condition comprises an absence of speech information in a portion of said channel information.

12. A circuit emulation method, comprising the steps of:
synchronizing with each of a plurality of circuit-switched channels;

receiving a plurality of frames from said plurality of circuit-switched channels;

forwarding or removing frame information received from said plurality of circuit-switched channels in response to a predetermined condition; and multiplexing said plurality of forwarded frames of information to assemble a packet for transmission over a packet-switched network.

13. The circuit emulation method of claim 12, further comprising the step of:
formatting said assembled packet for transmission over said packet-switched network.

14. The circuit emulation method of claim 12, wherein each of said circuit-switched channels comprises a narrow band channel for compressed speech.

15. The circuit emulation method of claim 12, wherein each of said circuit-switched channels comprises a GSM network channel.

16. The circuit emulation method of claim 12, wherein said predetermined condition comprises speech in said frame of information received from said circuit-switched channels, and said frame of information is forwarded for multiplexing.

17. The circuit emulation method of claim 12, wherein said predetermined condition comprises an absence of speech in said frame of information received from said circuit-switched channels, and said frame of information is not forwarded for multiplexing.

18. The circuit emulation method of claim 12, wherein said predetermined condition comprises uncompressed speech in said frame of information received from said circuit-switched channels, and said frame of information is not forwarded for multiplexing.

19. The circuit emulation method of claim 12, wherein said predetermined condition comprises a presence of a bad frame received from said circuit-switched channels, and said frame is not forwarded for multiplexing.

20. A circuit emulation method, comprising the steps of:
receiving a packet from a packet-switched network;
depacketizing said packet received from said packet-switched network;
demultiplexing said depacketized packet;
extracting channel information from said received packet; and
inserting filler information in said extracted channel information in response to a predetermined condition.

21. The circuit emulation method of claim 20, further comprising the step of formatting said channel information for transmission over a circuit-switched network.

22. The circuit emulation method of claim 20, wherein said predetermined condition comprises an absence of speech information in a portion of said channel information.

23. The circuit emulation unit of claim 1, wherein said multiplexer is further configured to construct a packet header containing information regarding a state of each of said plurality of circuit-switched channels, wherein said packet header comprises of a plurality of bits each indicative of the state of a corresponding one of said plurality of circuit-switched channels.

24. The circuit emulation unit of claim 1, wherein said packet is a variable size packet, said size determined based upon active ones of said plurality of circuit-switched channels.

25. The circuit emulation unit of claim 9, wherein said demultiplexer is further configured to extract the channel information from said received packets according to information contained within a header that describes a state of each of a plurality of channels, wherein said header includes a plurality of bits each indicative of the state of a corresponding one of said plurality of channels.

26. The circuit emulation unit of claim 9, wherein said packet is a variable size packet, said size determined based upon active ones of a plurality of channels.

27. The circuit emulation method of claim 12, further comprising the step of:
constructing a header containing information regarding a state of each of said plurality of circuit-switched channels, wherein said header includes a plurality of bits each indicative of the state of a corresponding one of said plurality of circuit-switched channels.

28. The circuit emulation method of claim 12, wherein said packet is a variable size packet, said size determined based upon the active ones of said plurality of circuit-switched channels.

29. The circuit emulation method of claim 20, further comprising the step of:
extracting the channel information from said received packets according to information contained within a header that includes information regarding a state of each of a plurality of channels, wherein said header comprises a plurality of bits each indicative of the state of a corresponding one of said plurality of channels.

30. The circuit emulation method of claim 20, wherein said packet is a variable size packet, said size determined based upon active ones of said plurality of channels.

31. The circuit emulation method of claim 12, further comprising:
transmitting said packet over the packet-switched network without transmitting control signals when a connection involving the circuit-switched channels is active.

* * * * *

UNITED STATES PATENT AND TRADEMARK OFFICE
CERTIFICATE OF CORRECTION

PATENT NO.   : 6,577,620 B1
DATED        : June 10, 2003
INVENTOR(S)  : Peter Galyas et al.

It is certified that error appears in the above-identified patent and that said Letters Patent is hereby corrected as shown below:

<u>Column 6,</u>
Lines 17-20, delete "a plurality of removal units, each one of said plurality of removal units coupled to one of a plurality of circuit-switched channels, for forwarding or removing a frame of information"

Signed and Sealed this

Tenth Day of February, 2004

JON W. DUDAS
*Acting Director of the United States Patent and Trademark Office*